US011028891B2

(12) United States Patent
Lee et al.

(10) Patent No.: US 11,028,891 B2
(45) Date of Patent: Jun. 8, 2021

(54) VENTED BRAKE DISC

(71) Applicant: Kwangjin Michael Lee, Novi, MI (US)

(72) Inventors: Kwangjin Michael Lee, Novi, MI (US); Byungchang Lee, Daegu (KR); Sungmin Lee, Daegu (KR); Bongjoon Kim, Daegu (KR)

(73) Assignee: Kwangjin Michael Lee, Novi, MI (US)

( * ) Notice: Subject to any disclaimer, the term of this patent is extended or adjusted under 35 U.S.C. 154(b) by 137 days.

(21) Appl. No.: 16/152,677

(22) Filed: Oct. 5, 2018

(65) Prior Publication Data

US 2019/0107160 A1 Apr. 11, 2019

(30) Foreign Application Priority Data

Oct. 11, 2017 (KR) .................. 10-2017-0129924

(51) Int. Cl.
F16D 65/12 (2006.01)
B32B 3/08 (2006.01)
(Continued)

(52) U.S. Cl.
CPC .......... F16D 65/128 (2013.01); B32B 3/085 (2013.01); B32B 15/01 (2013.01); F16D 65/123 (2013.01);
(Continued)

(58) Field of Classification Search
CPC .......... F16D 65/123; F16D 2016/1308; F16D 2016/1316; F16D 2016/1328;
(Continued)

(56) References Cited

U.S. PATENT DOCUMENTS 3,295,640 A * 1/1967 Beuchle .................. F16D 55/32
188/218 A
3,623,577 A * 11/1971 Scharlack ............. F16D 65/127
188/71.6
(Continued)

FOREIGN PATENT DOCUMENTS

CN 103307150 A 9/2013
CN 104653668 A 5/2015
(Continued)

OTHER PUBLICATIONS

Grant of Patent corresponding to Korean Patent Application No. 10-2017-0129924, dated Jun. 20, 2019.

Primary Examiner — Bradley T King
(74) Attorney, Agent, or Firm — Nelson Mullins Riley & Scarborough LLP; Kongsik Kim, Esq.

(57) ABSTRACT

A vented brake disc according to the present disclosure comprises a first braking plate having a first inner surface and a first outer surface; a second braking plate parallel with and spaced apart from the first braking plate, the second braking plate having a second outer surface, and a second inner surface facing the first inner surface; a plurality of channels defined by two walls adjacent to each other, the channels communicating with the inner peripheral space of the first braking plate and with the inner peripheral space of the second braking plate; a hat portion having a mounting surface and a peripheral portion extended axially from the mounting surface; a first blocking part preventing outboard communication of any one of the channels, the first blocking part connecting the peripheral portion to the first braking plate; and a second blocking part preventing inboard communication of the channel adjacent to the channel where the outboard communication is prevented by the first blocking part, the second blocking part connecting the peripheral portion to the second braking plate. The channels are pro- (Continued)

vided between the first inner surface of the first braking plate and the second inner surface of the second braking plate. The first blocking part and the second blocking part are provided along the peripheral portion.

10 Claims, 10 Drawing Sheets

(51) Int. Cl.
 *B32B 15/01* (2006.01)
 *F16D 65/02* (2006.01)
(52) U.S. Cl.
 CPC .... *B32B 2605/00* (2013.01); *F16D 2065/132* (2013.01); *F16D 2065/1328* (2013.01); *F16D 2065/1388* (2013.01)
(58) Field of Classification Search
 CPC ..... F16D 2065/1308; F16D 2065/1316; F16D 2065/1328
 USPC .................................................. 188/218 XL
 See application file for complete search history.

(56) References Cited

U.S. PATENT DOCUMENTS

| | | | |
|---|---|---|---|
| 4,177,883 A * | 12/1979 | Margetts | F16D 65/123 188/218 XL |
| 4,809,827 A * | 3/1989 | Suzuki | F16D 65/128 188/218 XL |
| 4,930,606 A | 6/1990 | Sporzynski et al. | |
| 5,005,676 A * | 4/1991 | Gassiat | F16D 55/28 188/218 XL |
| 5,161,652 A * | 11/1992 | Suzuki | F16D 65/128 188/18 A |
| 5,180,037 A | 1/1993 | Evans | |
| 5,322,145 A | 6/1994 | Evans | |
| 5,430,926 A | 7/1995 | Hartford | |
| 5,460,249 A * | 10/1995 | Aoki | F16D 65/123 188/218 XL |
| 5,509,510 A | 4/1996 | Ihm | |
| 5,535,856 A | 7/1996 | McCormick et al. | |
| 5,542,503 A | 8/1996 | Dunn et al. | |
| 5,544,726 A * | 8/1996 | Topouzian | F16D 65/125 188/218 XL |
| 5,549,181 A | 8/1996 | Evans | |
| 5,921,354 A | 7/1999 | Evans | |
| 6,378,665 B1 | 4/2002 | McCormick et al. | |
| 6,386,335 B1 | 5/2002 | DiPonio | |
| 6,536,564 B1 * | 3/2003 | Garfinkel | F16D 65/12 188/218 XL |
| 6,550,590 B1 | 4/2003 | Ranganathan | |
| 7,066,306 B2 | 6/2006 | Gavin | |
| 9,188,180 B2 * | 11/2015 | Webster | F16D 65/123 |
| 2005/0269173 A1 * | 12/2005 | Tedesco | F16D 65/128 188/218 XL |
| 2005/0269174 A1 * | 12/2005 | Lin | F16D 65/12 188/218 XL |
| 2006/0086579 A1 | 4/2006 | Gerber | |
| 2007/0199778 A1 | 8/2007 | Lee | |
| 2009/0020379 A1 * | 1/2009 | Hanna | F16D 65/12 188/218 XL |
| 2010/0175955 A1 * | 7/2010 | Holzschuh | F16D 65/128 188/218 XL |
| 2013/0075208 A1 * | 3/2013 | Lee | F16D 65/12 188/218 XL |
| 2017/0175835 A1 * | 6/2017 | Peck | F16D 65/847 |

FOREIGN PATENT DOCUMENTS

| | | |
|---|---|---|
| CN | 103307150 B | 1/2016 |
| CN | 108361302 A | 8/2018 |
| KR | 10-2005-0049081 A | 5/2005 |
| KR | 1020050049081 A | 5/2005 |

* cited by examiner (a)

(b)

VENTED BRAKE DISC

CROSS-REFERENCE TO RELATED APPLICATION

The present application claims priority to Korean Patent Application No. 10-2017-0129924 filed on Oct. 11, 2017, the entire contents of which are incorporated herein by reference.

TECHNICAL FIELD

The present disclosure relates to a vented brake disc, and particularly, to a vented brake disc where the inlets of cooling channels are provided on both of an inboard and an outboard thereof.

BACKGROUND

Brake pads compress against a brake disc, thereby generating a frictional force to brake a vehicle. It is important to effectively discharge thermal energy generated by the frictional force. For effective cooling, a vented brake disc which has cooling ducts provided along the outer periphery thereof has been widely used in general vehicles as well as high performance vehicles.

The vented brake discs are classified into a general vented brake disc wherein inlets of cooling ducts are provided in an inboard side thereof and an inverted hat rotor wherein inlets of cooling ducts are provided in an outboard side thereof. In the present specification, the term "inboard" means the vehicle side of the brake disc, and the term "outboard" means the opposite side of the vehicle side. The inverted hat rotor is designed to minimize disc coning, i.e., deformation of an outer peripheral portion of the disc toward the outboard side due to heat at a high temperature.

However, cooling performance is not good at a rotor which has the inlets of cooling ducts provided in only one side. The vented brake disc which has the inlets of cooling ducts provided on both of the inboard side and the outboard side thereof has been developed in order to enhance cooling performance. U.S. Pat. No. 6,550,590 issued on Apr. 22, 2003 discloses such a vented brake disc. The vented brake disc has the three braking plates wherein the inlets of cooling ducts are provided on both of the inboard side and the outboard side thereof, thereby improving cooling performance. However, the vented brake disc is heavy, and the inlets of the cooling ducts should be narrowed in order to meet the design specification relating to given thickness of the brake disc.

Another conventional vented brake disc is disclosed in U.S. Patent Application Publication No. US2007/0199778A1 published on Aug. 30, 2007. However, the inlets of cooling ducts of the vented brake disc are also narrow, and stress is concentrated on support arms connecting the cooling ducts to a hat portion.

SUMMARY

Accordingly, the present disclosure has been made in view of the above-mentioned problems occurring in the prior art, and it is an object of the present disclosure to provide a vented brake disc that is provided with inlets of cooling channels formed on both of an inboard and an outboard thereof.

To accomplish the above-mentioned object, according to the present disclosure, there is provided a vented brake disc comprising: a first braking plate having a first inner surface and a first outer surface; a second braking plate parallel with and spaced apart from the first braking plate, the second braking plate having a second outer surface, and a second inner surface facing the first inner surface; a plurality of channels defined by two walls adjacent to each other, the channels communicating with the inner peripheral space of the first braking plate and with the inner peripheral space of the second braking plate; a hat portion having a mounting surface and a peripheral portion extended axially from the mounting surface; a first blocking part preventing outboard communication of any one of the channels, the first blocking part connecting the peripheral portion to the first braking plate; and a second blocking part preventing inboard communication of the channel adjacent to the channel where the outboard communication is prevented by the first blocking part, the second blocking part connecting the peripheral portion to the second braking plate. The channels are provided between the first inner surface of the first braking plate and the second inner surface of the second braking plate. The first blocking part and the second blocking part are provided along the peripheral portion.

The first blocking part and the second blocking part may be provided alternately to each other along the peripheral portion in a tangential direction.

The walls may be radially extended.

The hat portion may be a separate body from the first braking plate and the second braking plate.

The walls may have shapes of any one of linear, curved, and pillar-shaped vanes.

The sectional areas of the channel communicating with the inboard side may be the same as the sectional areas of the channel communicating with the outboard side. Further, the number of the first blocking parts may be different from the number of the second blocking parts.

The number of the first blocking parts may be the same as the number of the second blocking parts. Further, the sectional areas of the channels communicating with the inboard may be different from the sectional areas of the channels communicating with the outboard.

BRIEF DESCRIPTION OF DRAWINGS

The present disclosure will be more fully understood from the following detailed description taken in conjunction with the accompanying drawings.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, the present disclosure will be described in detail with reference to the accompanying drawings. As those skilled in the art would realize, the described embodiments may be modified in various different ways, all without departing from the spirit or scope of the present disclosure.

Figure 1:
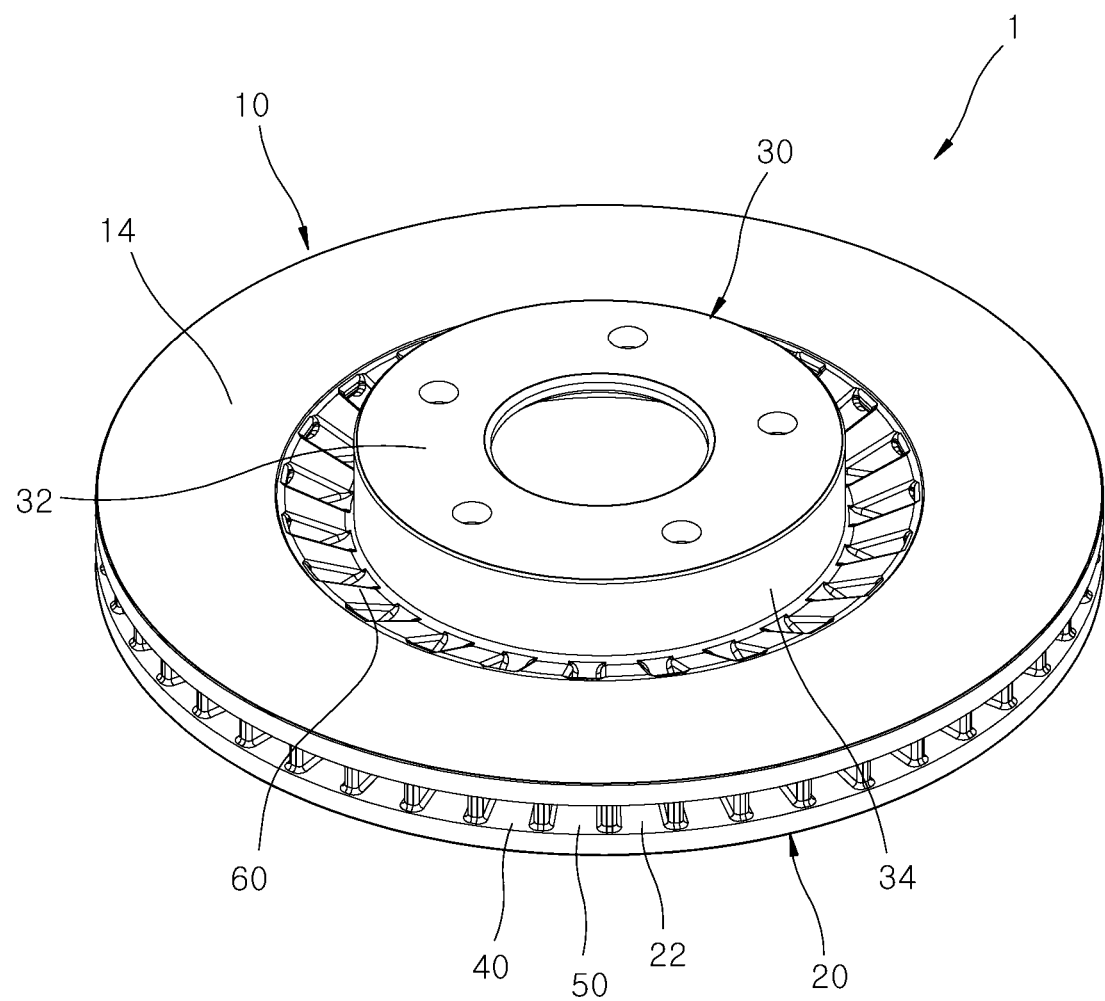
FIG. 1 shows a perspective view of a vented brake disc according to the present disclosure, which is viewed from an outboard side thereof.
Figure 2:
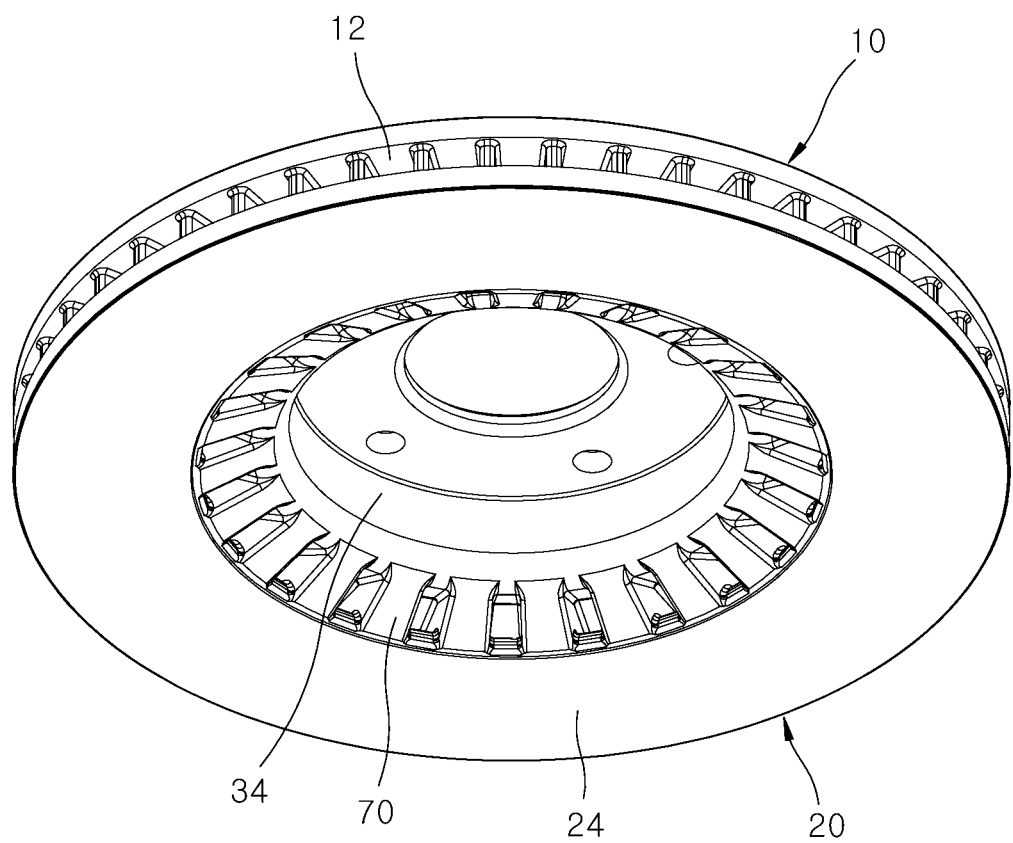
FIG. 2 shows a perspective view of the vented brake disc according to the present disclosure, which is viewed from an inboard side thereof.
Figure 3:
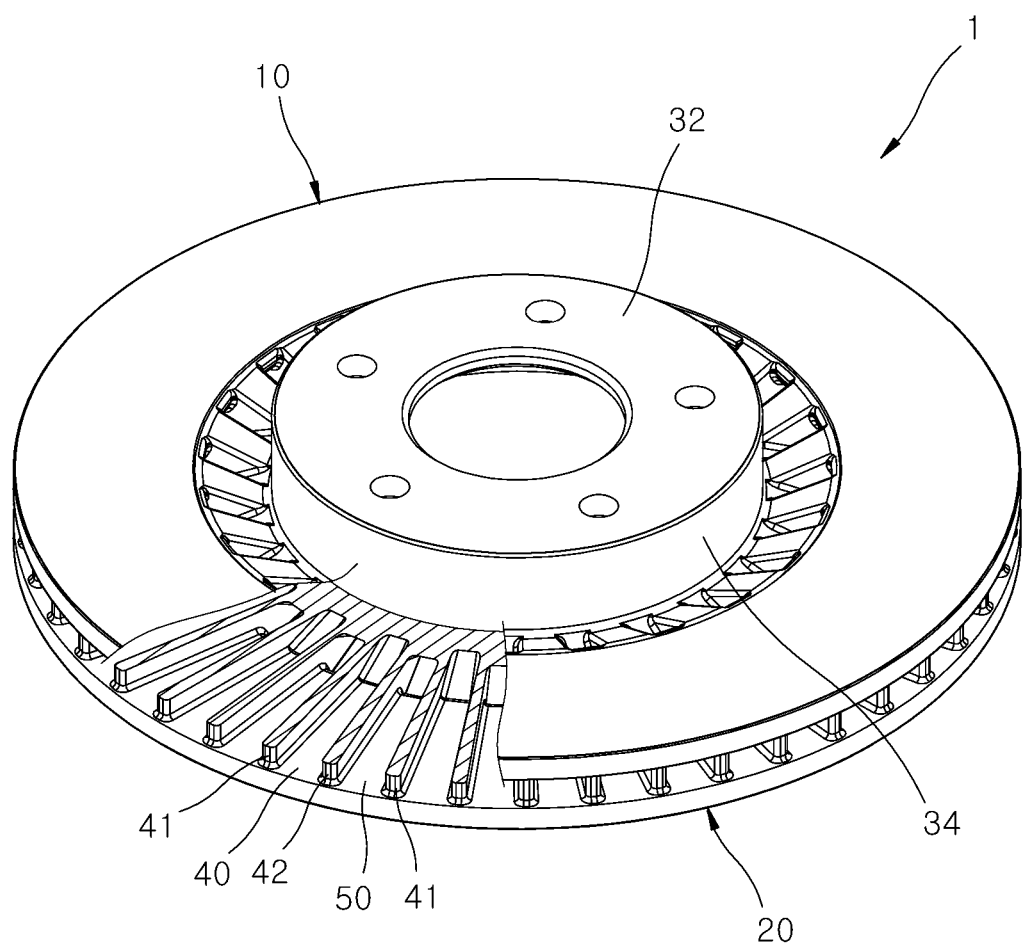
FIG. 3 shows a perspective view of the vented brake disc of FIG. 1 where a portion of a first braking plate is removed.

FIG. 1 shows a perspective view of a vented brake disc 1 according to the present disclosure, which is viewed from an outboard side thereof. FIG. 2 shows a perspective view of the vented brake disc 1 according to the present disclosure, which is viewed from an inboard side thereof.

The vented brake disc 1 according to the present disclosure comprises a first braking plate 10, a second braking plate 20, a hat portion 30, a first blocking part 60 connecting the first braking plate 10 to the hat portion 30, and a second blocking part 70 connecting the second braking plate 20 to the hat portion 30.

The first braking plate 10 comprises a first inner surface 12 and a first outer surface 14. The second braking plate 20 is parallel with and is spaced apart from the first braking plate 10. The second braking plate 20 comprises a second inner surface 22 and a second outer surface 24. The second inner surface 22 faces the first inner surface 12. The first braking plate 10 and the second braking plate 20 may have the same radial size and thickness.

The hat portion 30 comprises a mounting surface 32 coupled to a wheel driving shaft of a vehicle and a cylindrical peripheral portion 34 extended axially from the mounting surface 32.

The channels 40 and 50 are provided between the first inner surface 12 of the first braking plate 10 and the second inner surface 22 of the second braking plate 20 to form cooling ducts. Each of the channels 40 and 50 is defined by two adjacent walls 41 and 42. Each channel communicates with the outside at the outer peripheries of the first braking plate 10 and the second braking plate 20. Each channel is provided to communicate with the inner peripheral space of the first braking plate 10 and the inner peripheral space of the second braking plate 20 at the peripheral portion 34. Although the walls 41 and 42 are shown to extend linearly in a radial direction, other known walls of the vented brake disc may be chosen. For example, the walls 41 and 42 may be curved vanes or pillar-shaped vanes.

Figure 4:
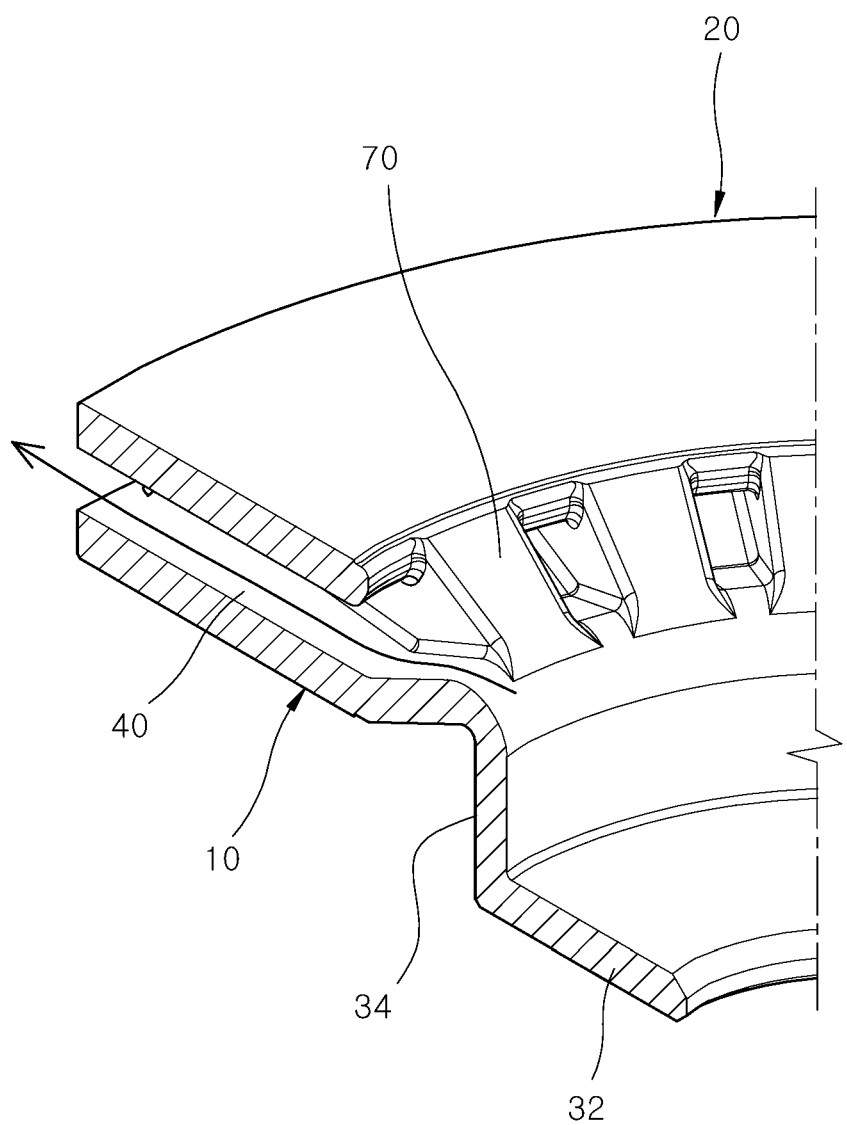
FIG. 4 shows a sectional perspective view of a partial cutaway portion of FIG. 1, wherein a channel communicating to the inboard is shown from the inboard side.
Figure 5:
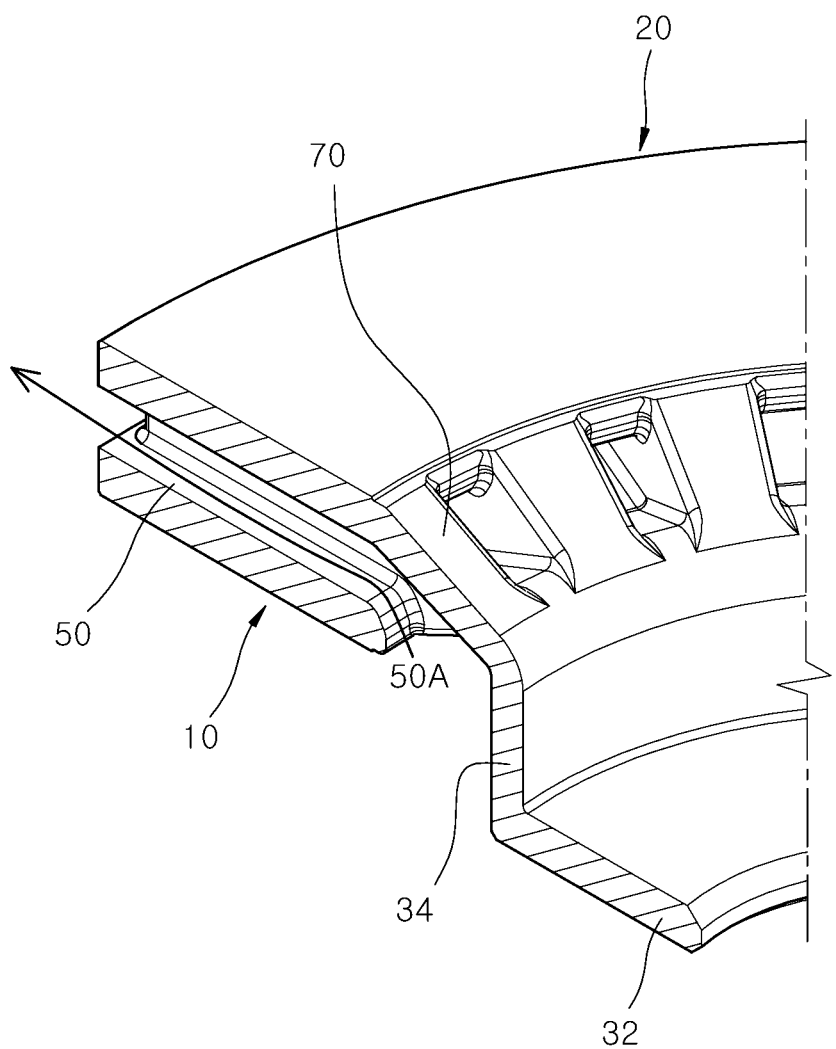
FIG. 5 shows a sectional perspective view of a partial cutaway portion of FIG. 1, wherein a channel communicating to the outboard is shown from the inboard side.
Figure 6:
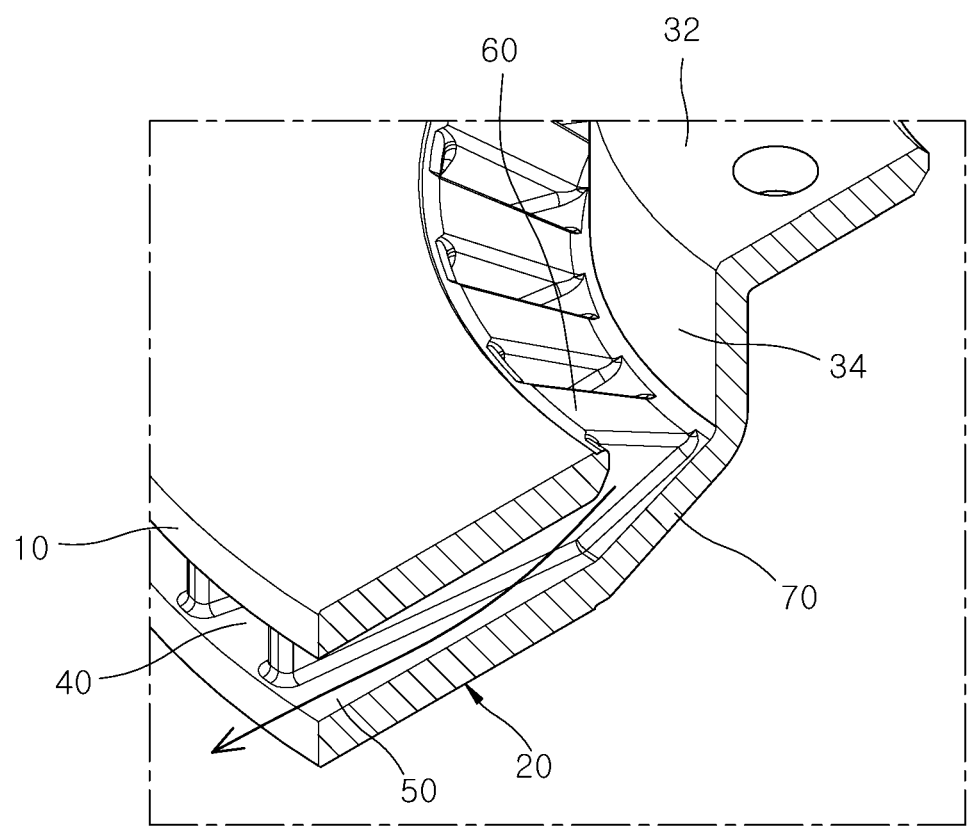
FIG. 6 shows a sectional perspective view of a partial cutaway portion of FIG. 1, wherein a channel communicating to the outboard is shown from the outboard side.
Figure 7:
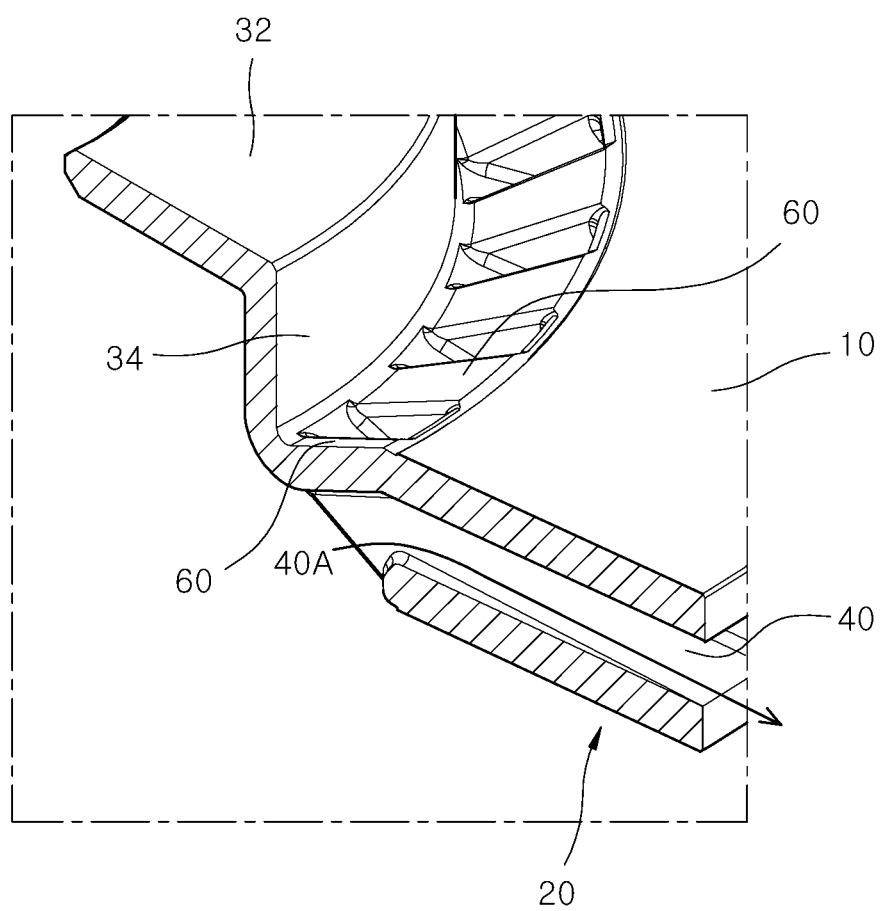
FIG. 7 shows a sectional perspective view of a partial cutaway portion of FIG. 1, wherein a channel communicating to the inboard is shown from the outboard side.

FIGS. 4 and 5 shows the sectional perspective views of a partial cutaway portion of FIG. 1, wherein the inboard side directs upward. FIGS. 6 and 7 shows the sectional perspective views of a partial cutaway portion of FIG. 1, wherein the outboard side directs upward.

The peripheral portion 34 and the first braking plate 10 are connected to each other by means of the first blocking part 60. The peripheral portion 34 and the second braking plate 20 are connected to each other by means of the second blocking part 70. A plurality of the first blocking parts 60 and the second blocking parts 70 may be provided along the peripheral portion 34. According to the present disclosure, the first blocking parts 60 and the second blocking parts 70 may be provided alternately to each other along the peripheral portion 34 in a tangential direction. However, it should be understood that the scope of the present disclosure is not limited to the embodiment. For example, the blocking parts may be provided repeatedly by a pattern of one first blocking part 60 and two second blocking parts 70. Alternatively, the blocking parts may be provided with no specific pattern.

Figure 10:
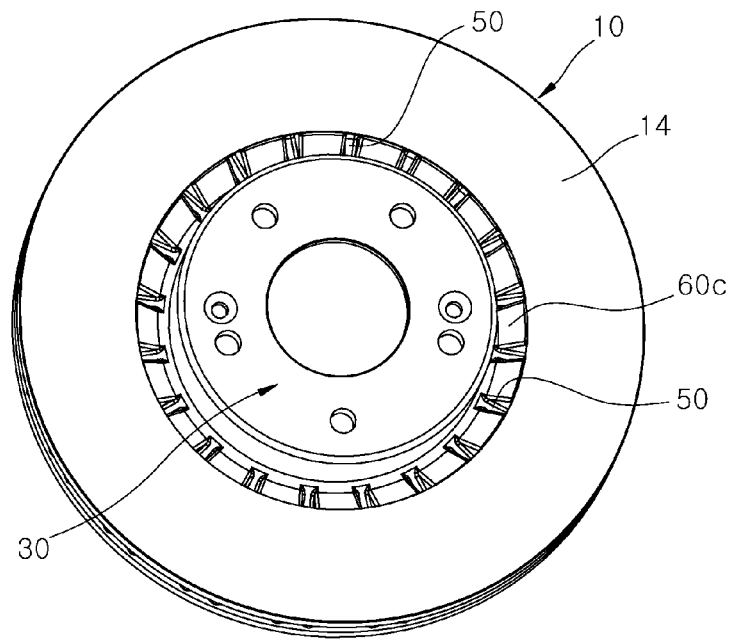
FIG. 10 shows the perspective views of a vented brake disc according exemplary embodiments of the present disclosure.
Figure 10:
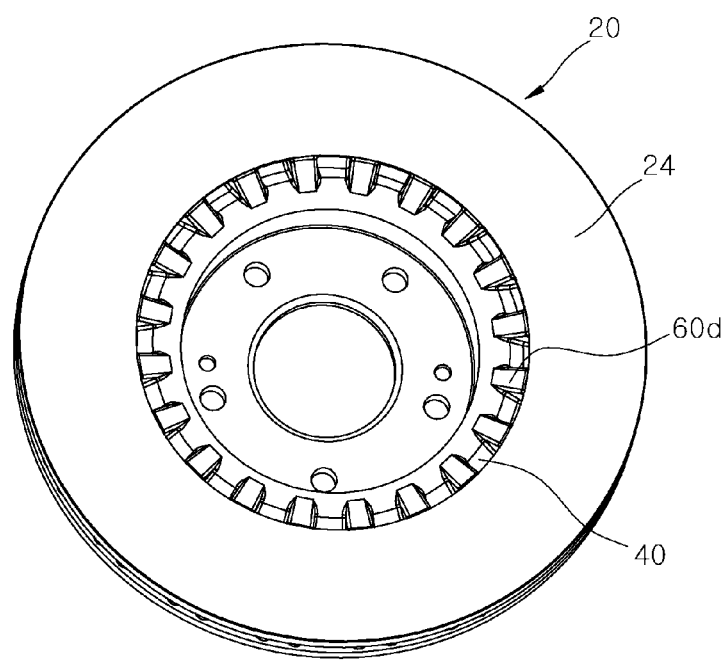

Amounts of cooling air introduced from the outboard and inboard of the brake disc depend upon the design of a splash shield, a wheel opening or a lower body structure of a vehicle. According to the present disclosure, ratio of the amounts of cooling air introduced from the outboard side and inboard side of the brake disc can be adjusted. As one adjusting way, the cooling channels (40) of the inboard side and the cooling channels (50) of the outboard side may set to have the same sectional areas while the number of cooling channels (40) of the inboard side may set to be different from the number of cooling channels (50) of the outboard side. As another way, the number of cooling channels (40) of the inboard side and the number of cooling channels (50) of the outboard side may set to be the same to each other while the cooling channels (40) of the inboard side and the cooling channels (50) of the outboard side may set to have the different sectional areas as shown in FIG. 10.

The first blocking part 60 prevents the outboard communication of any one channel, for example, the first channels 40, among the channels 40 and 50. The second blocking part 70 prevents the inboard communication of the second channel 50 adjacent to the first channel 40. As a result, as shown in FIGS. 4 and 7, the inlet of the first channel 40 communicates with the inboard side. Further, as shown in FIGS. 5 and 6, the inlet of the second channel 50 communicates with the outboard side.

As shown in FIGS. 4 to 7, cooling is performed by a first air-flow through the first channel 40 which communicates with the inboard side 40A and by a second air-flow through the second channel 50 which communicates with the outboard side 50A.

Figure 8:
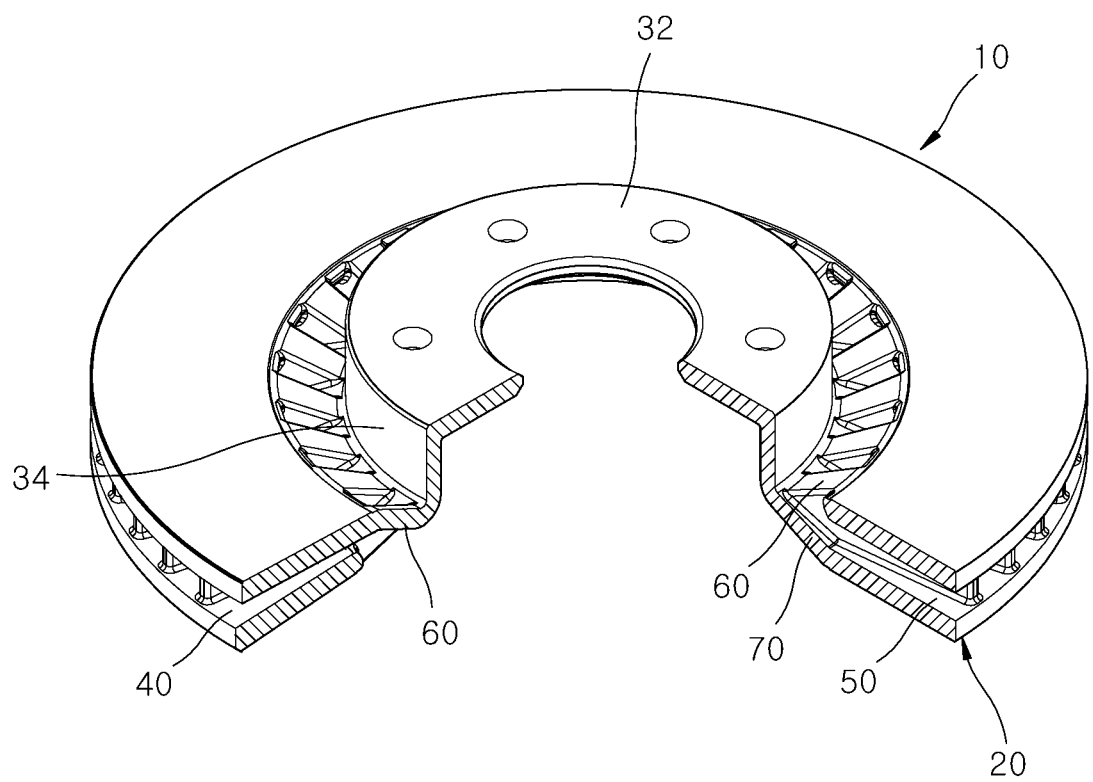
FIG. 8 shows a sectional perspective view of the vented brake disc wherein a portion of FIG. 1 is removed.

FIG. 8 shows a sectional perspective view of the vented brake disc wherein a portion of FIG. 1 is removed. It can be clearly understood from the drawings that the first channels 40 communicates with the inboard side and the second channel 50 communicates with the outboard side.

Figure 9:
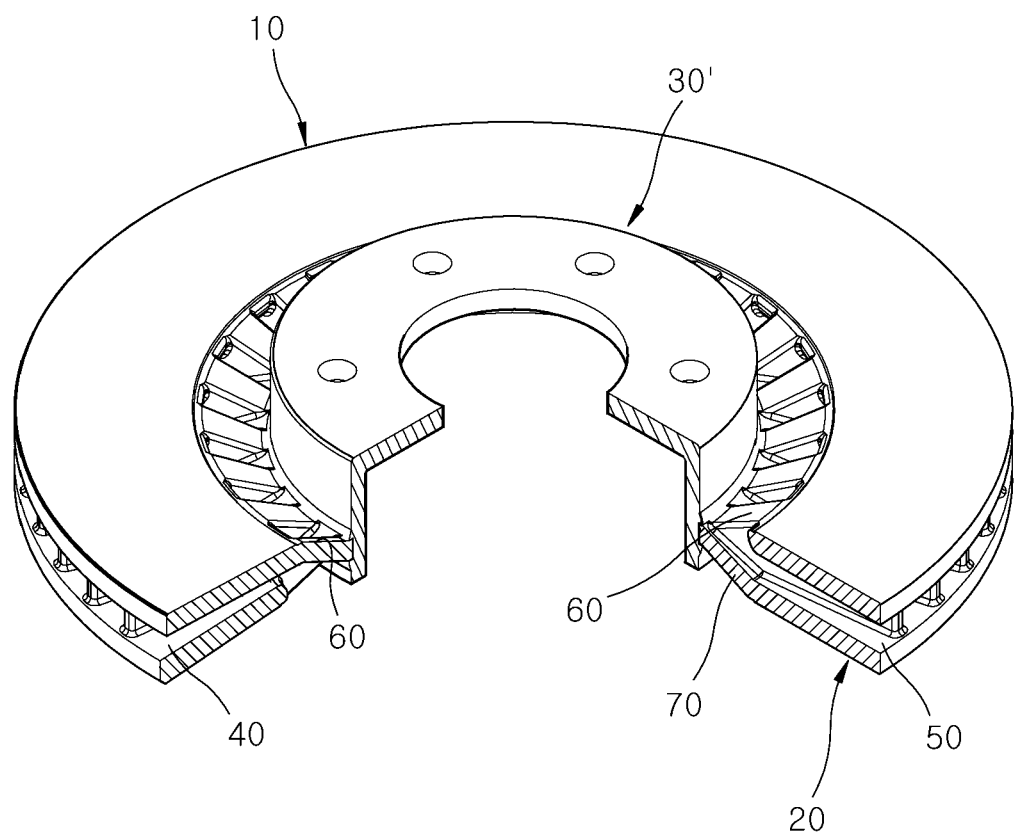
FIG. 9 shows a sectional perspective view of an embodiment wherein a hat portion is a separate body from the brake disc and a portion of the brake disc is removed.

FIG. 9 shows a perspective view of a two-piece rotor type brake disc wherein a hat portion 30' is provided separately from the braking plates.

As described above, the vented brake disc according to the present disclosure is provided with the cooling channels communicating with both of the inboard side and outboard side thereof, thereby achieving higher cooling performance than the vented brake disc communicating with one of the inboard and outboard sides thereof, and thereby also preventing stress concentration on a specific location. Moreover, the inlets of the cooling channels are provided alternately to each other in the inboard side and outboard side of the vented brake disc. Thus, the inlets do not become narrow, thereby preventing air-flow from being constricted. In addition, the vented brake disc according to the present disclosure shows reduced disc coning at a high temperature than the conventional brake disc which has the inlets of the cooling ducts provided in the inboard.

Although the present disclosure has been described with reference to accompanying drawings, the scope of the present disclosure is determined by the claims described below and should not be interpreted as being restricted by the embodiments and/or drawings described above. It should be clearly understood that improvements, changes and modifications of the present disclosure disclosed in the claims and apparent to those skilled in the art also fall within the scope of the present disclosure. Accordingly, this description is to be taken only by way of example and not to otherwise limit the scope of the embodiments herein.

What is claimed is:

1. A vented brake disc comprising:
   a first braking plate having a first inner flat surface and a first outer flat surface;
   a second braking plate parallel with and spaced apart from the first braking plate, the second braking plate having a second outer flat surface, and a second inner flat surface facing the first inner flat surface;
   a plurality of channels, wherein each of the plurality of channels is defined by the first inner flat surface, the second inner flat surface, and two adjacent walls provided between the first inner flat surface and the second inner flat surface;
   a hat portion having a mounting surface and a peripheral portion extended axially from the mounting surface;
   a first blocking part provided for a first set of channels among the plurality of channels, the first blocking part connecting the peripheral portion to the first braking plate and excluding an air-flow from an outboard side to the first set of channels; and
   a second blocking part provided for a second set of channels among the plurality of channels, the second blocking part connecting the peripheral portion to the second braking plate and excluding an air-flow from an inboard side to the second set of channels,
   wherein the first blocking part and the second blocking part are provided along the peripheral portion,
   wherein a first air-flow enters the first set of channels from the inboard side and flows radially outward,
   wherein a second air-flow enters the second set of channels from the outboard side and flows radially outward, and
   wherein the first air-flow and the second air-flow radially exit the vented brake disc through openings formed between the first braking plate and the second braking plate without being mixed with each other.

2. The vented brake disc according to claim 1, wherein the first blocking part and the second blocking part are provided alternately to each other along the peripheral portion in a tangential direction.

3. The vented brake disc according to claim 1, wherein the walls are radially extended.

4. The vented brake disc according to claim 1, wherein the hat portion is a separate body from the first braking plate and the second braking plate.

5. The vented brake disc according to claim 1, wherein the walls have shapes of any one of linear, curved, and pillar-shaped vanes.

6. The vented brake disc according to claim 1, wherein a number of the first set of channels is equal to a number of the second set of channels, and
   wherein sectional areas of the first set of channels are different from sectional areas of the second set of channels.

7. The vented brake disc according to claim 2, wherein the walls are radially extended.

8. The vented brake disc according to claim 2, wherein the hat portion is a separate body from the first braking plate and the second braking plate.

9. The vented brake disc according to claim 2, wherein the walls have shapes of any one of linear, curved, and pillar-shaped vanes.

10. The vented brake disc according to claim 2, wherein a number of the first set of channels is equal to a number of the second set of channels, and
    wherein sectional areas of the first set of channels are different from sectional areas of the second set of channels.

* * * * *